Oct. 11, 1960  G. A. LYON  2,955,685
AIR CIRCULATION WHEEL STRUCTURE
Filed Oct. 27, 1958  2 Sheets-Sheet 1
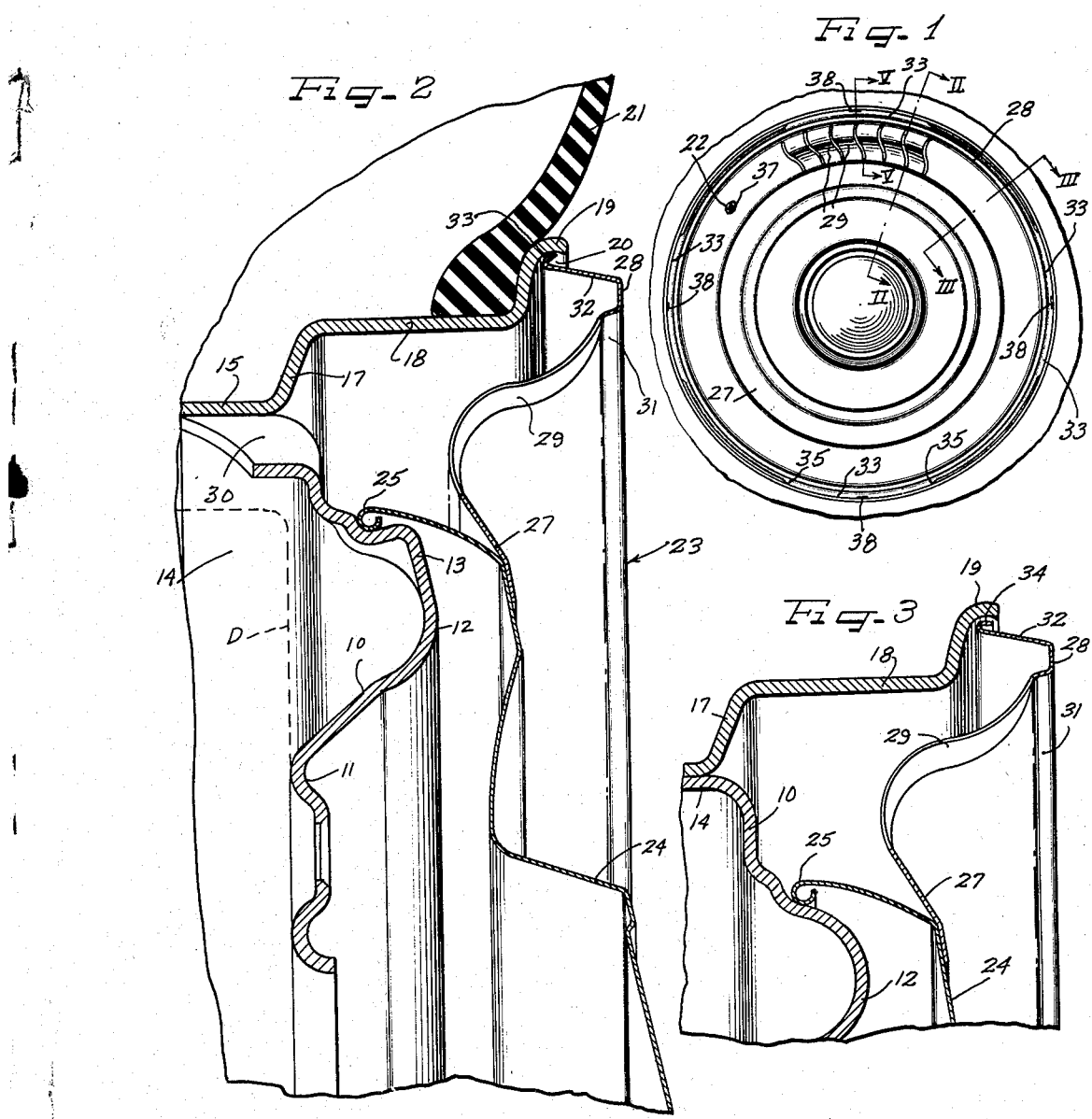
Inventor
George Albert Lyon

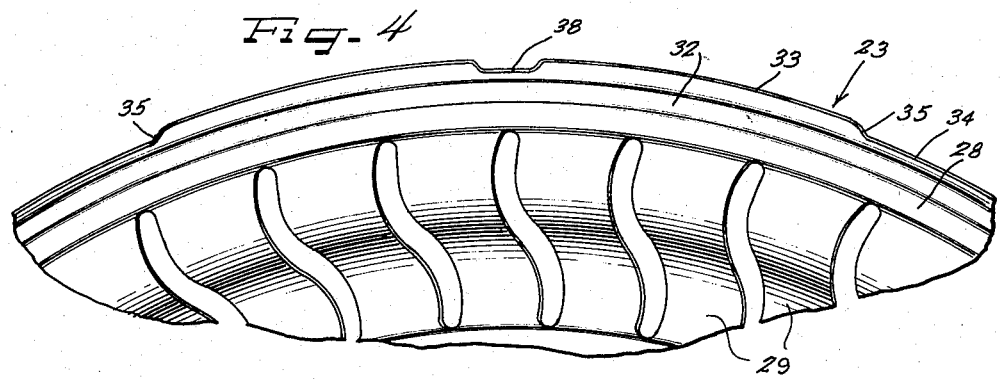
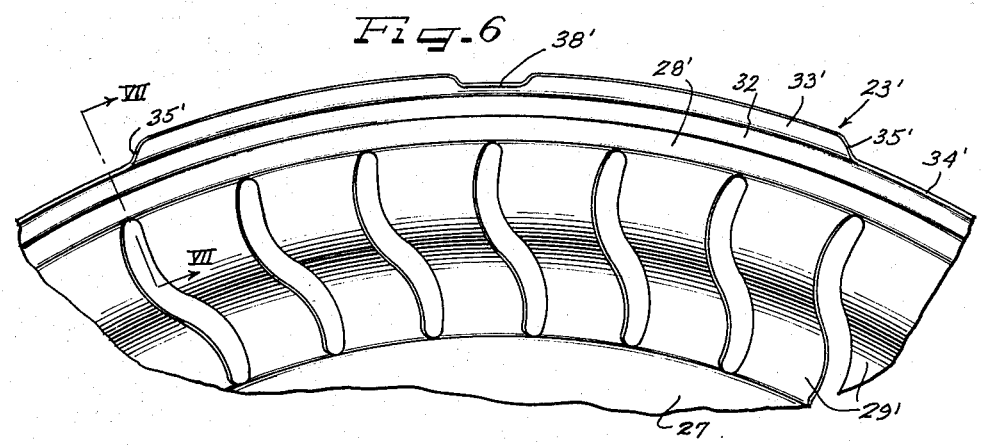
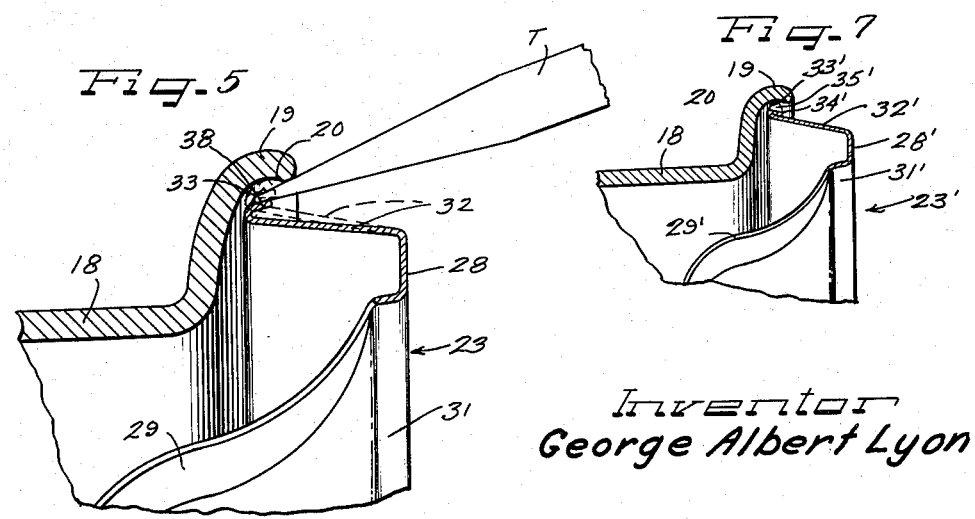
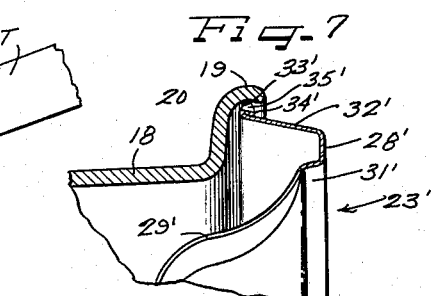
Inventor
George Albert Lyon

United States Patent Office 2,955,685
Patented Oct. 11, 1960

2,955,685

AIR CIRCULATION WHEEL STRUCTURE

George Albert Lyon, 13881 W. Chicago Blvd., Detroit, Mich.

Filed Oct. 27, 1958, Ser. No. 769,857

9 Claims. (Cl. 188—264)

The present invention relates to improvements in wheel structures and more particularly concerns such structures wherein circulation of air through the wheel for brake drum cooling is desirable even though the outer side of the wheel is ornamentally and protectively covered.

Automobiles have attained larger and heavier proportions and higher speeds while at the same time the size of automobile wheels has been reduced in order to enable the use of larger tires. This has greatly increased the load on the brakes of the vehicles and consequent danger of overheating of the brakes.

An important object of the present invention is to provide an improved wheel structure including novel cover structure for not only ornamentally and protectively covering the outer sides of the wheel but also improving circulation of brake drum cooling air through the wheel.

Another object of the invention is to provide an improved air circulation cover structure for disposition over the outer side of a vehicle wheel and having novel means for press-on, pry-off retention of the cover on the wheel.

A further object of the invention is to provide an economical, sturdy cover structure for disposition over the outer side of a vehicle wheel.

Still another object of the invention is to provide an improved wheel cover structure that lends itself readily to either a one-piece or a multi-part arrangement.

Other objects, features and advantages of the present invention will be readily apparent from the following description of certain preferred embodiments taken in conjunction with the accompanying drawings, in which:

Figure 1 is a side elevational view of a wheel structure embodying features of the invention;

Figure 2 is an enlarged fragmentary radial sectional detail view taken substantially on the line II—II of Figure 1;

Figure 3 is a fragmentary radial sectional detail view taken substantially on the line III—IIII of Figure 1;

Figure 4 is an enlarged fragmentary outer side elevational view of one portion of the cover of Figures 1–3;

Figure 5 is an enlarged fragmentary radial sectional detail view taken substantially on the line V—V of Figure 1;

Figure 6 is a fragmentary outer side elevational view of a modification of the cover; and Figure 7 is a fragmentary radial sectional detail view taken substantially on the line VII—VII of Figure 6 and showing the cover member of Figure 6 as applied to the outer side of a wheel.

Referring to Figures 1–5, a wheel with which the present invention is especially useful comprises a wheel body 10 having a central bolt-on flange 11 which is adapted to be attached to a vehicle axle structure including a brake drum D. An intermediate annular axially outwardly projecting nose bulge 12 of the wheel body has on the radially outer side thereof a circumferential series of spaced cover retaining bumps 13. About its outer margin, the wheel body 10 has a generally axially inwardly extending attachment flange 14 by which the wheel body is attached to a base flange 15 of a drop center, multi-flange tire rim including a side flange 17, an intermediate flange 18 and a terminal flange 19 providing a generally radially inwardly opening annular groove 20. A pneumatic tire 21 which may be of the tubeless variety is carried by the tire rim and is adapted to be inflated through a valve stem 22 carried by the side flange 17 of the tire rim.

In the present instance, a composite cover assembly including an annular cover member 23 and a hub cap 24 is shown, the hub cap having a marginal flange including a terminal bead 25 by which it is engageable in press-on, pry-off relation with the cover retaining bumps 13 on the wheel body.

Although the annular cover member 23 is shown as coactive with the hub cap 24 so as to afford the appearance of a full disk cover over the wheel, it will be appreciated that if preferred the cover member 23 may be of the full disk type, eliminating the hub cap 24. In any even, the cover member 23 is adapted to be made from suitable sheet material such as stainless steel or brass or aluminum alloy or other suitable sheet metal which is adapted to be drawn or stamped into shape and suitably surface finished as by polishing and plating, or otherwise.

As shown, the cover member 23 includes an annular radially inner portion 27 which is dimensioned to overlie and overlap the hub cap 24 marginally in the assembly. Spaced radially outwardly from the inner portion 27 of the cover member is an annular substantially rigid cover portion 28 which is connected to the inner cover portion 27 by means of a series of circumferentially spaced louver spoke elements 29 which are formed integrally in one piece with the cover members 27 and 28, are of generally ogee sinuous shape in radial section and of twisted louver shape in transverse, that is circumferential direction. The louvers 29 are disposed to lie in assembly with the wheel opposite wheel openings 30 provided at juncture of the wheel body 10 with the tire rim for effecting circulation of air through the wheel in the rotation of the cover with the wheel in service.

At their radially outer extremities, the spoke louvers 29 merge with the axially inner end of a generally axially extending annular flange 31 providing a radially inner wall of a rib-like rigid annular formation of the outer marginal cover portion 28. Thereby, the crest or axially outermost portion of the ridge of the marginal rib 28 is axially outwardly offset relative to the adjacent ends of the louver spokes 29 in protective relation.

At the radially outer side of the marginal rib 28, is provided a generally axially inwardly extending annular flange 32 which extends preferably generally axially inwardly and radially outwardly to a diameter at its axially inner end which is slightly less than the inside diameter of the lip of the terminal flange 19. At its terminus, the outer flange 32 is provided with cover retaining means comprising circumferentially spaced generally radially outwardly offset retaining finger portions 33 of a continuous annular generally return-bent terminal flange 34 extending generally axially outwardly at the radially outer side of the inner margin of the flange 32. The entire return-bent terminal flange 34 inclusive of the retaining finger portions 33 thereof is quite short and stiff relative to the axially extending flange 32 which due to its length is resiliently flexible. As will be observed in Figure 1, the radially outwardly offset finger portions 33 are of substantial width or arcuate extent, comprising approximately ⅛ of the circumference of the cover, with the intervening inset portions of the flange 34 of about the same width. As may be observed on comparison of Figures 2 and 3, supplemented by Figure 4, the finger portions and the intermediate portions of the flange 34 extend generally divergently relative to one another from juncture with the flange 32. Substantially rigid and reinforcing connections between the sides of the finger portions 33 and the remaining portions of the flange 34 are provided by gusset-like, angular offsetting bend juncture portions 35.

Normally the extremities of the finger portions 33 extend to a slightly greater diameter than the inside diameter of the terminal flange lip of the tire rim, with the intermediate portions of the cover terminal flange 34 inset to a smaller diameter than the terminal flange lip inside diameter. As a result, the four retaining finger portions 33 are engageable in strong gripping radially outwardly thrusting engagement within the groove 20 of the rim terminal flange lip.

Assembly of the cover member 23 is effected by registering the valve stem 22 through a valve stem aperture 37 in the louvered portion of the cover member, and generally orienting the cover finger portions 33 at each side of the valve stem aperture 37 within the rim groove 20. Axially inward pressure on the remainder of the cover portion 28 effects snapping of the retining finger portions 33 at the opposite side of the cover member from the valve stem aperture 37 into the retaining groove 20, with the tips of all of the retaining fingers 33 gripping uniformly radially outwardly firmly against the lip of the terminal flange 19. Since the inward pressure against the cover is commonly applied by striking the margin of the cover with a rubber mallet, it will be apparent that the axially substantially rigid rib-like marginal portion 28 of the cover affords an effective buffer for the adjacent radially outer end portions of the spoke louvers 29.

In the assembled relationship of the cover member 23, the inner marginal portion 27 of the cover member engages under resilient tension against the hub cap 24 as enabled by the resiliency of the spoke louvers 29.

In order to facilitate prying of the cover member 23 free from the wheel, the retaining finger portions 33 are provided with preferably central pry-off tool indentations 38 (Figs. 1, 4 and 5) affording clearance into which the tip of a pry-off tool T can be inserted and then leverage applied by fulcruming of the tool against the tip of the terminal flange lip of the tire rim to resiliently flex the engaged retaining finger portion 33 generally radially inwardly as enabled by flexure of the cover flange 32 and then lifting of the retaining finger from the rim groove 20 by continued leverage of the pry-off tool.

In the modification of Figures 6 and 7, a cover 23' is shown which in general respects is the same as the cover 23 except that the in-between finger portions of the terminal flange 34' of the cover are pressed up into lapping relation to the opposing marginal portion of the cover flange 32' as best seen in Figure 7. This results in the in-between portions of the flange 34' being more flexible under conditions where greater flexibility is desired. Moreover, in this form a pry-off tool can be inserted past the pressed tight portions of the flange 34' alongside any selected one of the retaining finger portions 33' and pry-off force applied for dislodging the selected retaining finger. On the other hand, pry-off notches 38' can be provided in the intermediate portions of the retaining fingers 33'.

It will be understood that modifications and variations may be effected without departing from the scope of the novel concepts of the present invention.

I claim as my invention:

1. In a wheel structure including a wheel body and a multi-flange tire rim with openings through the wheel body adjacent juncture with the tire rim for cooling circulation of air through the wheel for cooling a brake drum with which the wheel may be assembled, a cover structure for the outer side of the wheel including a circular cover member having air circulation promoting louver spokes in an annular series opposite the wheel openings and a radially outer marginal substantially rigid rib-like portion including a circular generally axially inwardly extending flange of a diameter to be telescoped into a terminal flange lip of the tire rim, said axially extending flange having a generally axially outwardly turned short and stiff continuous annular terminal flange with spaced portions of such flange providing retaining finger projections offset generally radially outwardly to a slightly larger diameter than the inside diameter of the terminal lip flange for press-on, pry-off retaining engagement with said lip flange.

2. In a wheel structure including a wheel body and a multi-flange tire rim with openings through the wheel body adjacent juncture with the tire rim for cooling circulation of air through the wheel for cooling a brake drum with which the wheel may be assembled, a cover structure for the outer side of the wheel including a circular cover member having air circulation promoting louver spokes in an annular series opposite the wheel openings and a radially outer marginal substantially rigid rib-like portion including a circular generally axially inwardly extending flange of a diameter to be telescoped into a terminal flange lip of the tire rim, said axially extending flange having a generally axially outwardly turned short and stiff continuous annular terminal flange with spaced portions of such flange providing retaining finger projections offset generally radially outwardly to a slightly larger diameter than the inside diameter of the terminal lip flange for press-on, pry-off retaining engagement with said lip flange, said finger projections being connected to the remaining portions of the terminal cover flange by angular side reinforcing junctures.

3. In a wheel structure including a wheel body and a multi-flange tire rim with openings through the wheel body adjacent juncture with the tire rim for cooling circulation of air through the wheel for cooling a brake drum with which the wheel may be assembled, a cover structure for the outer side of the wheel including a circular cover member having air circulation promoting louver spokes in an annular series opposite the wheel openings and a radially outer marginal substantially rigid rib-like portion including a circular generally axially inwardly extending flange of a diameter to be telescoped into a terminal flange lip of the tire rim, said axially extending flange having a generally axially outwardly turned short and stiff continuous annular terminal flange with spaced portions of such flange providing retaining finger projections offset generally radially outwardly to a slightly larger diameter than the inside diameter of the terminal lip flange for press-on, pry-off retaining engagement with said lip flange, said marginal cover rib-like portion having a buffer crest offset axially outwardly beyond the adjacent radially outer ends of the spoke louvers so as to protect the same against striking of a cover applying mallet.

4. In a wheel structure including a multi-flange tire rim having a terminal flange lip extending generally axially outwardly and providing a generally radially inwardly opening groove, a cover for disposition over the outer side of the wheel including a radially outer circular portion for overlying the terminal flange of the tire rim and having a generally axially inwardly extending continuous annular flange for telescoping in spaced relation within the terminal flange lip and providing with a return-bent continuous annular short and stiff terminal flange having at circumferentially spaced intervals generally radially outwardly angled offset finger portions with the edges thereof normally extending to a slightly larger diameter than the inside diameter of the terminal flange lip and engageable therewith in tensioned thrusting retaining engagement within said groove, said terminal cover flange intermediate the finger portions being angled obliquely away from said axially extending flange and thus substantially stiffening the entire flange and terminal flange structure.

5. In a wheel structure including a multi-flange tire rim having a terminal flange lip extending generally axially outwardly and providing a generally radially inwardly opening groove, a cover for disposition over the outer side of the wheel including a radially outer circular portion for overlying the terminal flange of the tire rim and having a generally axially inwardly extending continuous annular flange for telescoping in spaced relation within the terminal flange lip and provided with a return-bent continuous annular short and stiff terminal flange having at circumferentially spacel intervals generally radially outwardly angled offset finger portions with the edges thereof normally extending to a slightly larger diameter than the inside diameter of the terminal flange lip and engageable therewith in tensioned thrusting retaining engagement within said groove, the intermediate portions of the cover terminal flange being in lapping engagement against the opposing marginal portion of said axially extending flange.

6. In a cover for disposition over the outer side of a vehicle wheel having a terminal flange with a generally axially extending lip portion, a circular cover member having a radially outer marginal generally axially inwardly extending flange longer than the terminal lip flange and provided at its axially inner terminus with a return-bent continuous annular cover retaining flange provided with offset retaining finger portions at circumferentially spaced intervals engageable with the radially inner face of the terminal lip flange, said offset finger portions each comprising approximately ⅛ the circumference of the cover.

7. In a cover for disposition over the outer side of a vehicle wheel having a terminal flange with a generally axially extending lip portion, a circular cover member having a radially outer marginal generally axially inwardly extending flange longer than the terminal lip flange and provided at its axially inner terminus with a return-bent continuous annular cover retaining flange provided with offset retaining finger portions at circumferentially spaced intervals engageable with the radially inner face of the terminal lip flange, the terminal cover flange intermediate portions being lappingly engaged with the axially extending flange and thus increasing the resilient flexibility of the in-between portions of the cover terminal flange and enabling engagement by a pry-off tool.

8. In a cover for disposition over the outer side of a vehicle wheel having an annular flange with a radially inwardly opening groove, a circular cover member having a generally U-shaped rib-like annular axially outwardly projecting marginal portion with a generally axially inwardly extending generally frusto-conical flange on the radially outer side thereof provided with a continuous annular turned angular terminal flange with portions thereof offset and engageable in press-on, pry-off relation within said groove.

9. In a cover for disposition over the outer side of a vehicle wheel having an annular flange with a radially inwardly opening groove, a circular cover member having a generally U-shaped rib-like annular axially outwardly projecting marginal portion with a generally axially inwardly extending generally frusto-conical flange on the radially outer side thereof provided with a continuous annular turned angular terminal flange with portions thereof offset and engageable in press-on, pry-off relation within said groove, said rib-like annular marginal portion having on the radially inner side thereof a generally axially inwardly extending flange spaced from said frusto-conical flange said cover member having extending generally radially inwardly from said radially inner flange of said marginal rib-like portion a series of generally radially extending resilient louver spokes connected at their radially inner ends to an annular continuous cover portion.

References Cited in the file of this patent

UNITED STATES PATENTS

| | | |
|---|---|---|
| 2,123,025 | Ramirez | July 5, 1938 |
| 2,127,600 | Hunt | Aug. 23, 1938 |
| 2,421,756 | Lyon | June 10, 1947 |
| 2,433,854 | Lyon | Jan. 6, 1948 |
| 2,493,001 | Lyon | Jan. 3, 1950 |
| 2,757,980 | Lyon | Aug. 7, 1956 |
| 2,857,209 | Lyon | Oct. 21, 1958 |